Aug. 22, 1950  J. C. STOKES  2,519,716
BEARING ASSEMBLY
Filed March 6, 1946  2 Sheets-Sheet 1
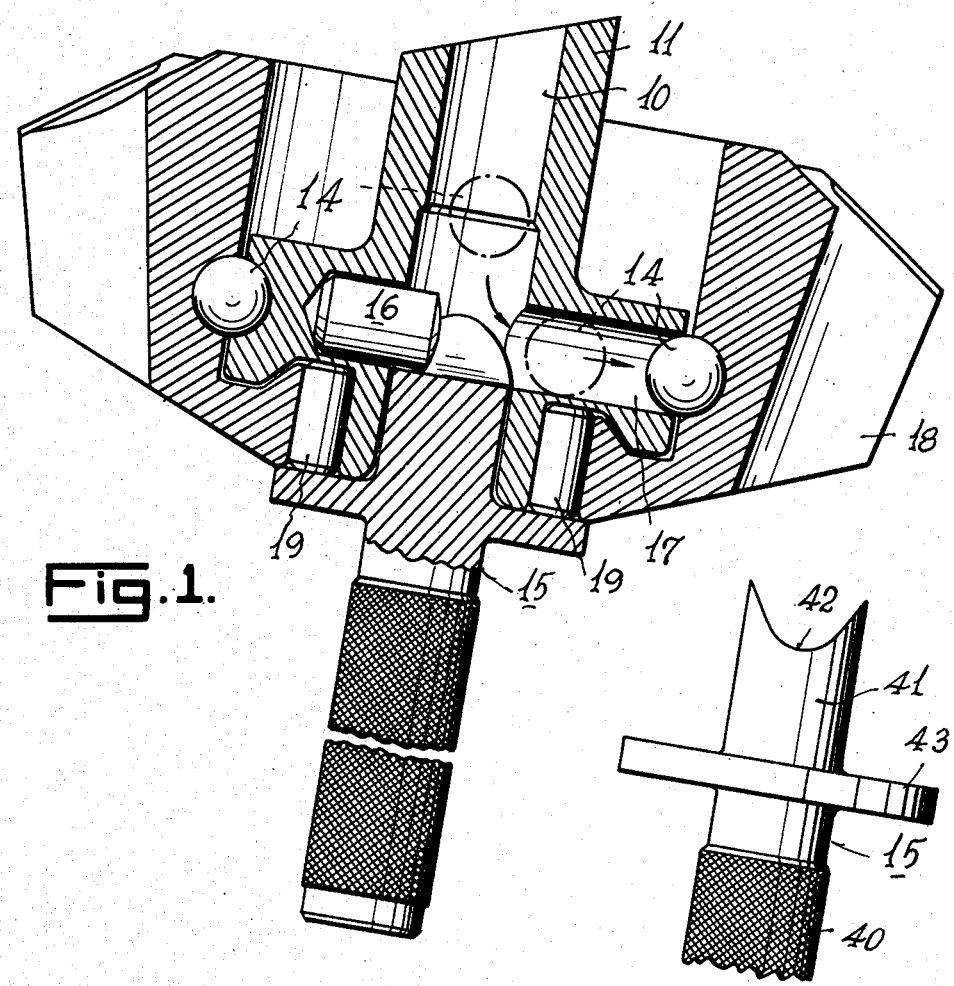
Fig. 1.
Fig. 2.
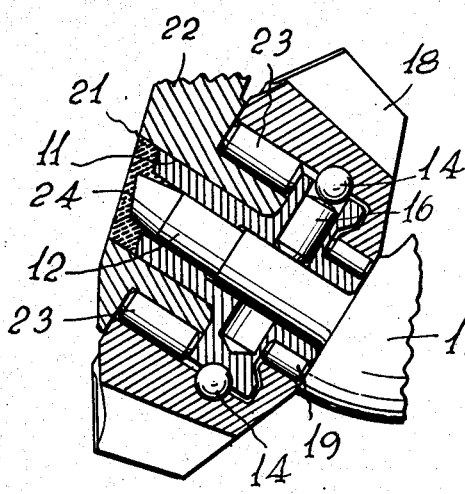
Fig. 3.
INVENTOR.
John C. Stokes.
BY J. Vincent Martin;
Ralph R. Browning;
James B. Simms.
ATTORNEYS Aug. 22, 1950     J. C. STOKES     2,519,716
BEARING ASSEMBLY Filed March 6, 1946     2 Sheets-Sheet 2

INVENTOR.
John C. Stokes,
BY J. Vincent Martin.
Ralph R. Browning.
James B. Simms.
ATTORNEYS Patented Aug. 22, 1950

2,519,716

UNITED STATES PATENT OFFICE 2,519,716

BEARING ASSEMBLY

John C. Stokes, Houston, Tex., assignor to Reed Roller Bit Company, Houston, Tex., a corporation of Texas Application March 6, 1946, Serial No. 652,383

6 Claims. (Cl. 308—198)

This invention relates to drilling bits.

More particularly the invention relates to improvements in drill bits of the roller type used for the purpose of drilling wells, such as oil, gas and water wells by the rotary method of drilling. The invention also concerns a cutter bearing for a drill bit, the bearing to be employed in the side roller cutter of a cross roller bit, or in the reamer roller cutter of a piloted bit.

The principal object of the invention concerns the manner of insertion and the locking in place of the ball bearings of the thrust portion of the bearing.

Another object of the invention is to provide an auxiliary tool of an improved form to facilitate the insertion of the ball bearings in the roller cutters.

Other objects and advantages of this invention will become apparent from the following description taken in connection with the accompanying drawings, wherein are set forth by way of illustration and example certain embodiments of this invention.

In the drawings:

Fig. 1 is a vertical cross section through the side roller cutter of a cross roller bit, showing the manner of using the auxiliary bearing assembling tool;

Fig. 2 is a view of the bearing assembling tool;

Fig. 3 is a vertical cross section through a portion of a drilling tool showing the roller cutter of Fig. 1 mounted upon the stub shaft on the bridge of the drilling bit;

Figure 4:
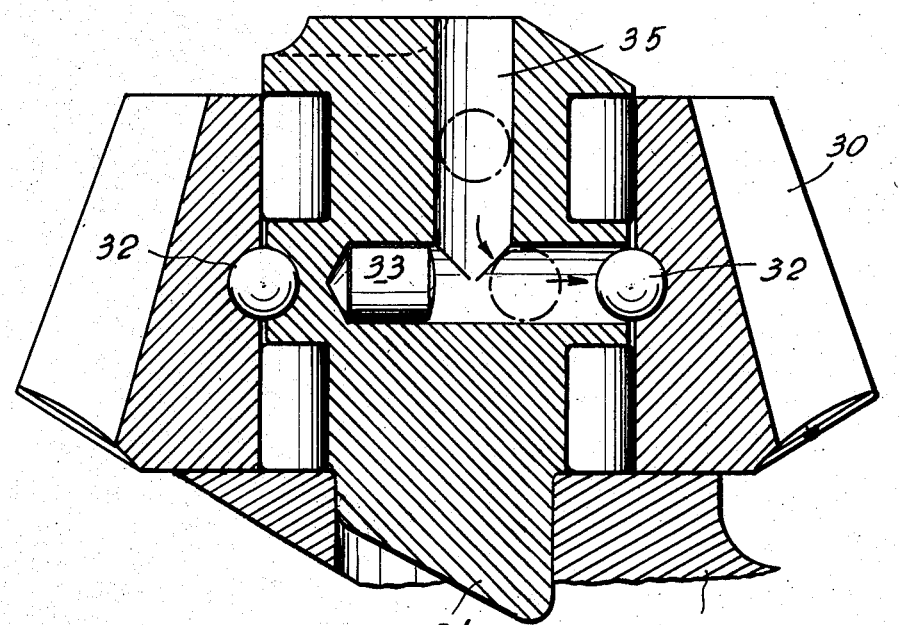
Fig. 4 is a vertical cross section through a portion of a roller reamer cutter of a piloted drilling bit.

In the form of the invention shown in Figs. 1, 2 and 3, the invention is illustrated in connection with one of the side cutters of a cross roller bit. These cutters are adapted to cut at the sides and bottom of the hole along an annular path and receive a great variety of enormous stresses in both radial and axial directions with respect to the axis of the cutter. These cutters are provided with internal roller bearings which extend along a substantial portion of the length of the cutter to take the radial load, together with ball bearings near one end of the cutter adapted to take the thrust loads.

It is to be noted that the principal feature of this invention has to do with the manner of insertion and locking in place of the ball bearings. In each case, the ball bearings are put in place through an axially extending passageway which intersects a radially extending passageway leading to the ball bearing race. This radially extending passageway extends into the race in one direction from the axial passageway, and also extends in the opposite direction from the axial passageway a distance sufficient to permit a sealing plug which is to close the radial passageway and retain the ball bearings in the race, to be moved out of the way into the blind end of the radial passageway while the ball bearings are being inserted.

Referring to Fig. 1, the axial passageway 10 in the bearing shaft 11 is the same passageway subsequently used to receive the stub shaft 12 on the bridge 13 of the bit as more fully appears in Fig. 3. During insertion of the ball bearings 14 one end of the axial passageway 10 is closed by means of the tool indicated as an entirety by the numeral 15, in Figs. 1 and 2.

In assembling the ball bearings 14 shown in Fig. 1, the sealing or locking plug 16 is first dropped into place through the only open end of the radial passageway 17, formed in the bearing shaft, until it occupies the position shown in Fig. 1. The bearing shaft 11 is then put in place within the cutter 18 and the roller bearings 19 are inserted. The auxiliary assembling tool 15 is then put in place, as shown, until it abuts the end of the shaft 11 and the end of the cutter 18 and holds the roller bearings 19 in place, whereupon the shaft 11 is moved until its axis extends in a somewhat vertical direction, at which time the requisite number of ball bearings 14 are dropped into place in the passageway 10 and caused to run down and out through the radial passageway 17 into the bearing race, provided in the cutter 18 and the bearing shaft 11. After the ball bearing race has been filled, the entire device is tilted toward the open end of the radial passageway 17 until the sealing or locking plug 16 assumes the position illustrated in Fig. 3, whereupon the free end of the bearing shaft 11 is inserted into the opening 21 in the side cutter leg 22 on which the other set of roller bearings 23 has already been placed and held in position thereon by heavy grease. Finally the stub shaft 12 on the bridge 13 is inserted into the bearing shaft 11 (the assembly tool 15 having been removed) to hold the sealing or locking plug 16 in the position illustrated in Fig. 3, and then the stub shaft and bearing shaft are secured in the side cutter leg or support 22, by means of welding.

Figures 5, 6:
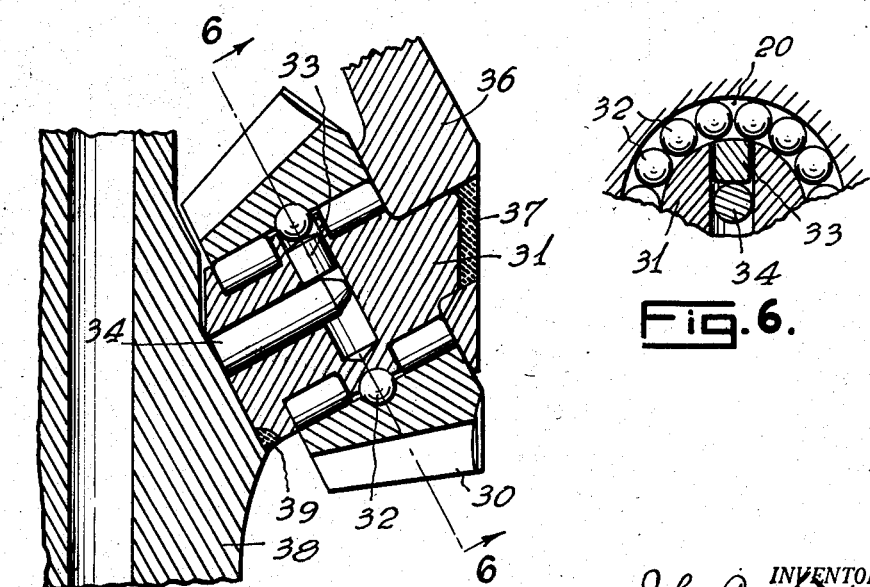
Fig. 5 is a vertical cross section showing the roller reamer cutter in assembled relation to the piloted bit.
Fig. 6 is a partial section taken on the line 6—6 of Fig. 5.

In Figs. 4 and 5, a roller reamer cutter 30 of of a piloted bit is shown mounted on the bearing shaft 31. The ball bearings 32 are assembled as in Figs. 1, 2 and 3, but instead of the stub shaft on the bridge holding the sealing or locking plug 33 in place, it is held in position by an auxiliary pin 34 inserted in the passageway 35 after the ball bearings have run into the race. The bearing shaft 31 is then welded to the side leg or support 36 as at 37 and to the body of the bit 38, as at 39.

The auxiliary assembly tool is shaped as shown in Figs. 1 and 2 and hardly needs description. The device consists of a cylindrical body 41 provided with a hand-grip 40, the extremity of the body portion opposite the hand-grip being hollowed out as at 42 to form a bottom for the axial bore and to complete the radial bore where the axial and radial bores intersect, as more clearly appears in Fig. 1. The device is provided with a transverse circular supporting flange 43, as shown, which flange is used to hold the roller bearings 19 in place during assembly. The body portion 41 is of a diameter to fit loosely in the passageway 18 of the cutter bearing shaft 11.

Having described my invention, I claim:

1. A roller bit provided with a bearing shaft having a raceway and an axial bore extending partially through the shaft, said shaft also having a radially extending passageway which intersects and extends across the axial bore and which has one end communicating with the raceway; a roller cutter to substantially enclose said bearing shaft, said roller cutter having a raceway; ball bearings; and a locking plug; said plug being insertable through said bore to assume a non-locking position within that end of the radially extending passageway remote from the raceway, said ball bearings being insertable through said bore and radially extending passageway into said raceways while said plug is within the radial passageway and said plug being moved from said non-locking position in the radially extending passageway to a locking position to hold said ball bearings in said raceways when said cutter is on said bearing shaft and means insertable into said bearing shaft to hold said plug in locking position, to rotatably lock said cutter on said bearing shaft.

2. A roller bit provided with a bearing shaft having a raceway and an axial bore, said shaft also having a radially extending passageway which intersects and extends across the axial bore and which is provided with but one outlet leading into said raceway; a roller cutter to substantially enclose said bearing shaft, said roller cutter having a raceway; ball bearings; and a locking plug; said plug being insertable through said bore to assume a non-locking position within that end of the radially extending passageway remote from the raceway, said ball bearings being insertable through said bore and radially extending passageway into said raceways while said plug is within said passageway and said plug being moved from said non-locking position in the radially extending passageway to a locking position to hold said ball bearings in said raceways when said cutter is on said bearing shaft and means insertable into said bearing shaft to hold said plug in locking position, to rotatably lock said cutter on said bearing shaft.

3. A roller bit provided with a bearing shaft having a raceway, an axial bore and a radial bore intersecting and extending across said axial bore and having but one outlet leading into said raceway; a roller cutter to substantially enclose said bearing shaft, said roller cutter having a raceway; ball bearings; and a locking plug; said plug being insertable through said radial bore to assume a non-locking position within said radial bore, said ball bearings being insertable through said axial and radial bores into said raceways while the plug is within the radial bore and said plug being moved from said non-locking position to a locking position within said radial bore to hold said ball bearings in said raceways when said cutter is on said bearing shaft and means insertable into said bearing shaft to hold said plug in locking position, to rotatably lock said cutter on said bearing shaft.

4. A roller bit provided with a bearing shaft having a raceway, an axial bore extending throughout the length of said bearing shaft, and a radial bore intersecting and extending across said axial bore and having but one outlet leading into said raceway; a roller cutter to substantially enclose said bearing shaft, said roller cutter having a raceway; ball bearings; and a locking plug; said plug being insertable through said radial bore to assume a non-locking position within that end of the radial bore remote from the outlet of said radial bore, said ball bearings being insertable through said axial and radial bores into said raceways while the plug is within the radial bore and said plug being moved from said non-locking position within the radial bore to a locking position to hold said ball bearings in said raceways when said cutter is on said bearing shaft and means insertable into said bearing shaft to hold said plug in locking position, to rotatably lock said cutter on said bearing shaft.

5. A roller bit provided with a bearing shaft having a raceway, an axial bore extending throughout the length of said bearing shaft, and a radial bore intersecting and extending across said axial bore, said radial bore having one end closed and its opposite end open and leading into said raceway; a roller cutter to substantially enclose said bearing shaft, said roller cutter having a raceway; ball bearings; and a locking plug; that portion of the radial bore adjacent its closed end and disposed on one side of the axial bore being of a sufficient length to receive the locking plug with said plug being insertable through said radial bore to assume a non-locking position therein adjacent the closed end thereof, said ball bearings being insertable through said axial and radial bores into said raceways while the plug is in non-locking position in the radial bore and said plug being moved from said non-locking position within the radial bore to a locking position to hold said ball bearings in said raceways when said cutter is on said bearing shaft and a bridge stub shaft insertable into said bearing shaft to hold said plug in locking position, to rotatably lock said cutter on said bearing shaft and means to secure said stub shaft to said bearing shaft.

6. A roller bit provided with a bearing shaft having a raceway, an axial bore, and a radial bore intersecting said axial bore, said radial bore having one end closed and its opposite end open leading into said raceway; a roller cutter to substantially enclose said bearing shaft, said roller cutter having a raceway; ball bearings; and a locking plug; the portions of the radial bore on opposite sides of the axial bore being of a sufficient length to receive the locking plug with said plug being insertable through said radial bore to assume a non-locking position therein adjacent the closed end thereof, said ball bearings being insertable through said axial and radial bores into said raceways while the plug is in non-locking position in the radial bore and said plug being moved from said non-locking position to a locking position within the radial bore to hold said ball bearings in said raceways when said cutter is on said bearing shaft and a pin insertable into said bearing shaft axial bore to hold said plug in locking position to rotatably lock said cutter on said bearing shaft.

JOHN C. STOKES.

REFERENCES CITED

The following references are of record in the file of this patent:

UNITED STATES PATENTS

| Number | Name | Date |
| --- | --- | --- |
| 1,627,965 | Gamble | May 10, 1927 |
| 2,214,221 | Catland | Sept. 10, 1940 |
| 2,210,279 | Catland | Aug. 6, 1940 |